United States Patent
Chakra et al.

(10) Patent No.: US 10,776,383 B2
(45) Date of Patent: Sep. 15, 2020

(54) AUTOMATIC REPLICATION OF AMBIGUOUS DATA BASED ON A POINT SYSTEM

(75) Inventors: Al Chakra, Apex, NC (US); Tim Friessinger, Böblingen (DE); Juergen Holtz, Pleidelsheim (DE)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 1059 days.

(21) Appl. No.: 13/485,578

(22) Filed: May 31, 2012

(65) Prior Publication Data

US 2013/0325799 A1    Dec. 5, 2013

(51) Int. Cl.
*G06F 16/27*    (2019.01)

(52) U.S. Cl.
CPC ................................ *G06F 16/27* (2019.01)

(58) Field of Classification Search
CPC .. H04L 67/2842; H04L 67/2852; G06F 16/27
See application file for complete search history.

(56) References Cited

U.S. PATENT DOCUMENTS

| | | | |
|---|---|---|---|
| 5,479,642 A * | 12/1995 | Jarvis | 711/144 |
| 5,924,096 A * | 7/1999 | Draper et al. | |
| 6,128,701 A * | 10/2000 | Malcolm et al. | 711/133 |
| 6,591,266 B1 * | 7/2003 | Li et al. | |
| 7,124,204 B2 | 10/2006 | Givoly et al. | |
| 7,552,223 B1 * | 6/2009 | Ackaouy et al. | 709/229 |
| 7,716,425 B1 * | 5/2010 | Uysal | G06F 12/0862 |
| | | | 711/137 |
| 8,037,349 B2 | 10/2011 | Mandagere et al. | |
| 9,436,292 B1 * | 9/2016 | Douglis | G06F 11/1453 |
| 2002/0198883 A1 * | 12/2002 | Nishizawa et al. | 707/10 |
| 2003/0187917 A1 * | 10/2003 | Cohen | 709/203 |
| 2003/0188106 A1 * | 10/2003 | Cohen | 711/133 |
| 2004/0068579 A1 * | 4/2004 | Marmigere et al. | 709/242 |
| 2004/0128346 A1 * | 7/2004 | Melamed | G06F 17/30902 |
| | | | 709/203 |

(Continued)

OTHER PUBLICATIONS

Vikali, Athena, Proxy Cache Replacement Algorithms: A History-Based Approach, 2002.*

(Continued)

*Primary Examiner* — Brittany N Allen
(74) *Attorney, Agent, or Firm* — Cantor Colburn LLP; Tracey Robertson

(57) ABSTRACT

A method for automatic data synchronization between a source system and a buffer system. The method includes identifying a configurable set of penalties, wherein each penalty defines a number of penalty points associated with a respective one of a plurality of events related to data set stored by the source system. The method also includes, in response detecting one or more events, calculating a total penalty score using the penalty points corresponding to each of the events. The method also includes determining that the total penalty score satisfies a predetermined penalty threshold indicating that the copy of the data set stored on the buffer system is presumed stale and, in response, initiating a data replication operation that updates the copy of data set stored on the buffer system with current data from the data set stored on the source system.

20 Claims, 7 Drawing Sheets

(56) References Cited

U.S. PATENT DOCUMENTS

| | | | |
|---|---|---|---|
| 2004/0230747 A1* | 11/2004 | Ims et al. | 711/133 |
| 2005/0055426 A1* | 3/2005 | Smith | G06F 17/30902 709/219 |
| 2005/0165758 A1* | 7/2005 | Kasten et al. | 707/3 |
| 2006/0271600 A1* | 11/2006 | Goh et al. | 707/201 |
| 2008/0028006 A1* | 1/2008 | Liu et al. | 707/204 |
| 2008/0049714 A1 | 2/2008 | Commarford et al. | |
| 2008/0228772 A1* | 9/2008 | Plamondon | G06F 17/30902 |
| 2008/0228899 A1* | 9/2008 | Plamondon | 709/219 |
| 2008/0229024 A1* | 9/2008 | Plamondon | 711/126 |
| 2008/0270560 A1* | 10/2008 | Tysowski | H04L 51/14 709/207 |
| 2009/0204753 A1* | 8/2009 | Bridge et al. | 711/106 |
| 2010/0057995 A1* | 3/2010 | Cao et al. | 711/133 |
| 2010/0114836 A1* | 5/2010 | Chan et al. | 707/662 |
| 2010/0332513 A1* | 12/2010 | Azar et al. | 707/769 |
| 2011/0040727 A1* | 2/2011 | Golab et al. | 707/618 |
| 2011/0161290 A1* | 6/2011 | Waterman et al. | 707/621 |
| 2011/0238621 A1* | 9/2011 | Agrawal | 707/610 |
| 2011/0251997 A1* | 10/2011 | Wang et al. | 707/634 |
| 2011/0320701 A1* | 12/2011 | Bronson et al. | 711/106 |
| 2012/0110110 A1* | 5/2012 | Luna | G06F 17/30902 709/213 |
| 2013/0067170 A1* | 3/2013 | Lam | G06F 16/9574 711/137 |
| 2013/0097309 A1* | 4/2013 | Ma et al. | 709/224 |

OTHER PUBLICATIONS

Olston, et al., Best-Effort Cache Synchronization with Source Cooperation, 2002.*

Basu, Associative Caching in Client-Server Databases, 1998.*

C. Olston and J. Widom. Best-Effort Cache Synchronization with Source Cooperation. ACM SIGMOD 2002 International Conference on Management of Data, Madison, Wisconsin, Jun. 2002. (Year: 2002).*

Chris Olston and Jennifer Widom, Best-Effort Cache Synchronization with Source Cooperation, ACM SIGMOD Jun. 4-6, 2002, Madison, Wisconsin, USA (Year: 2002).*

IBM Corporation, "POWER6 information: Data Replication", p. 1, Last updated Oct. 30, 2009 http://pic.dhe.ibm.com/infocenter/powersys/v3r1m5/index.jsp?topic=/ipha1/datareplication.htm.

Gao et al., "Improving Availability and Performance with Application-Specific Data Replication", IEEE Transactions on Knowledge and Data Engineering, vol. 17, No. 1, pp. 106-120, Jan. 2005.

* cited by examiner

US 10,776,383 B2

AUTOMATIC REPLICATION OF AMBIGUOUS DATA BASED ON A POINT SYSTEM

BACKGROUND

1. Technical Field

The present invention generally relates to data processing, and more particularly, to automatic data replication based on a point system.

2. Description of the Related Art

With the pervasiveness of distributed computing systems having distributed components sharing data, real time data synchronization between the distributed components has become costly in terms of time, communication bandwidth and/or data processing resources. To reduce such costs, it is desirable for components that buffer or cache shared data to support efficient data synchronization with other components also having a copy of the shared data.

BRIEF SUMMARY

Aspects of the described embodiments provide a method, a system, and a computer program product for automatic data synchronization between a source system and a buffer system. The method includes identifying a configurable set of penalties, wherein each penalty defines a number of penalty points associated with a respective one of a plurality of events related to a data set stored by the source system. The method also includes, in response detecting one or more events, calculating a total penalty score using the penalty points corresponding to each of the events. The method also includes determining that the total penalty score satisfies a predetermined penalty threshold indicating that the copy of the data set stored on the buffer system is presumed stale and, in response, initiating a data replication operation that updates the copy of data set stored on the buffer system with current data from the data set stored on the source system.

With the system implementation, the system includes a processor, a memory, and computer readable code that performs the various processes of the method by executing code on the processor. Finally, the computer program product implementation comprises a computer readable storage medium that includes computer readable code which, when executed by a processor, the code is configured to perform the method processes.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

BRIEF DESCRIPTION OF THE DRAWINGS

The description of the illustrative embodiments is to be read in conjunction with the accompanying drawings, wherein.

DETAILED DESCRIPTION

Figure 1:
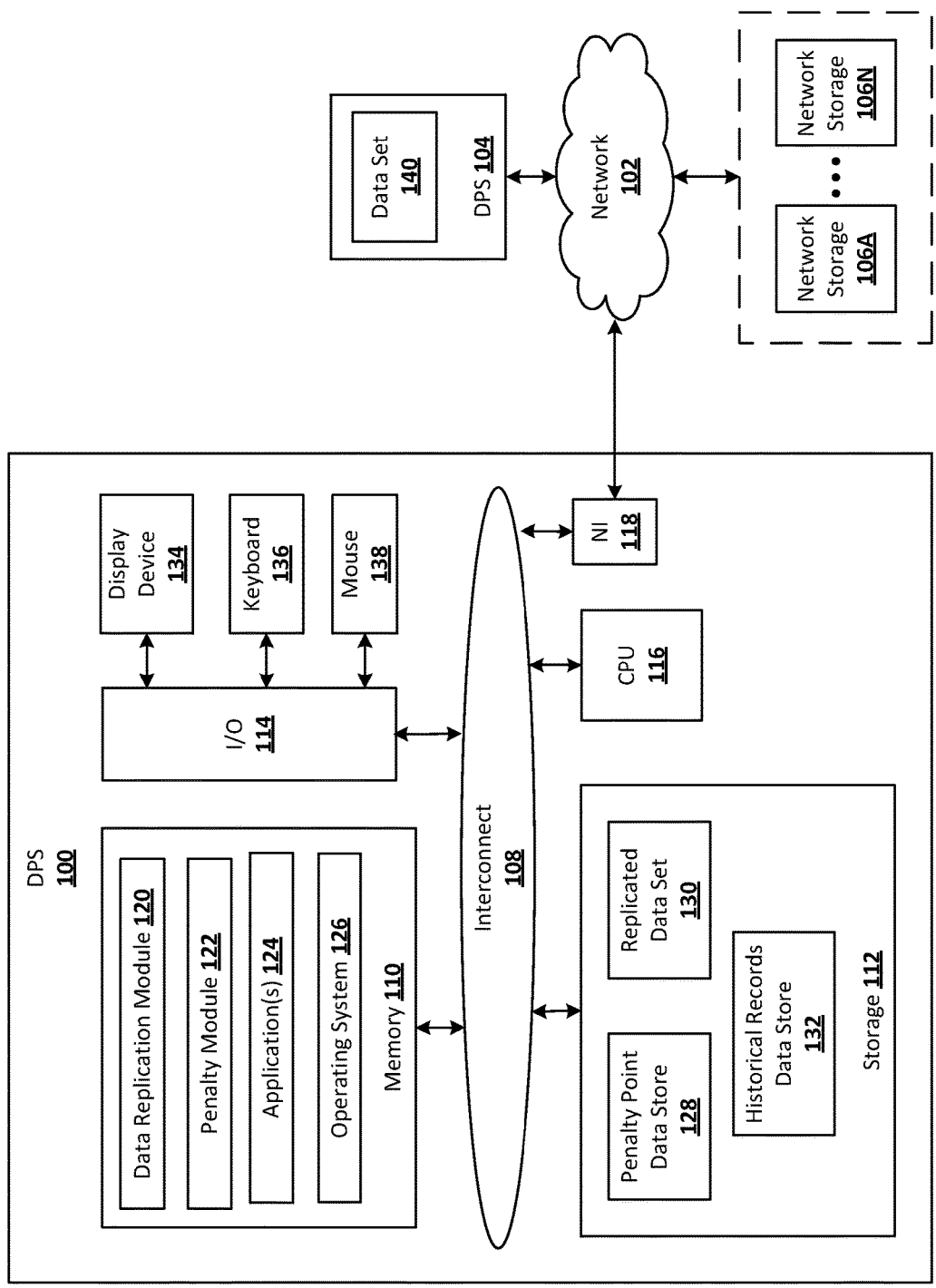
FIG. 1 provides a block diagram representation of an example data processing system within which the invention can be practiced, according to one embodiment.

The illustrative embodiments provide a method, system and computer program product for automatic data synchronization between a source system and a buffer system. Briefly, each of the source system and the buffer system includes storage. The buffer system is configured to retain a synchronized copy of data stored in the source system. A configurable set of penalties are associated with the source system. In one or more embodiments, each of the configurable set of penalties corresponds to an event, and the configurable set of penalties identifies a number of penalty points assigned to each event. When an event is detected, a total number of penalty points is calculated using the number of penalty points associated with the system. If the total number of penalty points satisfies a predetermined penalty threshold, a data replication operation is initiated, synchronizing data stored in the buffer system with data stored in the source system. In one embodiment, automatically initiating the data replication operation when the predetermined penalty threshold is satisfied provides an optimal balance between data accuracy in the buffer system and consumption of resources.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined by the appended claims and equivalents thereof.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions (or code). These computer program instructions may be provided to a processor of a general purpose computer, special purpose computer, or other programmable data processing apparatus to produce a machine, such that the instructions, which execute via the processor of the computer or other programmable data processing apparatus, implement the methods/processes/functions/acts specified in the one or more blocks of the flowchart(s) and/or block diagram(s).

These computer program instructions may also be stored in a computer readable medium that can direct a computer, other programmable data processing apparatus, or other devices to function in a particular manner, such that the instructions stored in the computer readable medium produce an article of manufacture (or computer program product) including instructions which implement the method/process/function/act specified in the one or more blocks of the flowchart(s) and/or block diagram(s). The computer program instructions may also be loaded onto a computer, other programmable data processing apparatus, or other devices to cause a series of operational steps to be performed on the computer, other programmable apparatus or other devices to produce a computer implemented process/method, such that the instructions which execute on the computer or other programmable apparatus implement the method/process/functions/acts specified in one or more blocks of the flowchart(s) and/or block diagram(s).

It is understood that the use of specific component, device and/or parameter names (such as those of the executing utility/logic described herein) are for example only and not meant to imply any limitations on the invention. The invention may thus be implemented with different nomenclature/terminology utilized to describe the components, devices, or parameters herein, without limitation. Each term utilized herein is to be given its broadest interpretation given the context in which that terms is utilized.

With reference now to the figures, and beginning with FIG. 1, there is depicted a block diagram representation of an example data processing system (DPS) 100, which is connected to a second DPS 104, as well as various network storage devices 106A-106N, across a network 104. In one or more embodiments, DPS 104 may include a storage device (not shown), which stores a data set 140. In one or more embodiments, any one of network storage 106A-106N may additionally, or alternatively, include one or more storage devices that store a data set.

DPS 100 includes numerous components logically connected by an interconnect 108. Specifically, FIG. 1 depicts DPS 100 including a memory 110, a storage 112, an input/output (I/O) controller 114, central processing unit (CPU) 116 (also interchangeably referred to as a processor), and network interface (NI) 118. Those skilled in the art will appreciate that CPU 116 can also be any kind of hardware processor. I/O controller 114 allows a user to interface with DPS 100 via one or more I/O devices. As depicted, I/O controller 114 provides an interface for such devices as a display device 134, a keyboard 136, and a mouse 138. According to one or more embodiments, display device 134 may include a liquid crystal display (LCD), a plasma display, a cathode ray tube (CRT) monitor, or any other kind of output mechanism.

Memory 110 may be random access memory (RAM), cache memory, flash memory, or any other kind of storage structure that is configured to store computer instructions/code executable by CPU 116 and/or to store data utilized during such execution. As depicted, memory 110 includes an operating system 126. Operating system 126 may be any platform that manages the execution of computer code and manages hardware resources. For example, operating system 126 may be the Advanced Interactive Executive (AIX®) operating system, the LINUX® operating system, or any other operating system known in the art. AIX® is a registered trademark of International Business Machines Corporation, and LINUX® is a registered trademark of Linus Torvalds.

Memory 110 also includes one or more applications 124 and a plurality of functional modules, such as a data replication module 120, and a penalty module 122. For purposes of clarity of this description, applications 124, as well as data replication module 120 and penalty module 122, are executable computer code which can be executed and which can manage replication of data set 140. In one or more embodiments, data replication module 120 includes computer code which, when executed by CPU 116, initiates a data replication operation that synchronizes data stored in replicated data set 130 with data stored in data set 140. Throughout this application, the device, or storage area, associated with data set 140 will be referred to as the source system, whereas the device, or storage area, associated with replicated data set 130 will be referred to as the buffer system. Although the source system and buffer system may refer to two distinct data processing systems (for example, as shown in FIG. 1), it is only necessary that the storage areas that store data set 140 and replicated data set 130 are separate from each other.

In one or more embodiments, penalty module 122 manages a configurable set of penalties and a predetermined penalty threshold. The configurable set of penalties and the predetermined penalty threshold may be stored, for example, in penalty point data store 128. In one or more embodiments, penalty point data store 128 indicates a number of penalty points associated with each of various events or conditions. In addition, in one or more embodiments, penalty module 122 may also dynamically modify the penalty points.

According to one or more embodiments, synchronization of data set 140 within replicated data set 130 by data replication module 120 may be triggered by penalty module 122, or may be separately initiated by a user. Penalty module 122 stores historical records related to conditions present at or around the time that a user initiates data replication module 120. For example, if a user initiates data replication module 120, penalty module 122 may record a time of the day, a day of the week, an elapsed time since the last time data replication module 120 executed, etc. Historical records may also indicate that the replication occurs following a network connection problem, following modification of a particular type of data in the source system, or any other event corresponding to the source system or buffer system at or around the time that data replication module 120 is initiated by a user. Penalty point data store 128 with be described in further detail with respect to FIG. 6A, below.

As depicted, DPS 100 also includes storage device or storage 112. The storage 112 may be any kind of computer storage device, volatile or non-volatile, such as a hard disk, an optical drive such as a compact disk drive or digital video disk (DVD) drive, and a flash memory drive. In one or more embodiments, the storage 112 includes one or more of a penalty point data store 128, a replicated data store 130, and a historical records data store 132. In one or more embodiments, the historical records data store 132 includes a set of records identifying conditions recorded at times that a user initiates the data replication module 120. The conditions stored in the historical records data store 132 may include, for example, a time of the day, a day of the week, an amount of time that has elapsed since the last time the data replication module 120 executed, data size of the last replication operation, or any other condition that affects a cost of executing the data replication operation 120. In one or more embodiments, the cost of executing the data replication operation module 120 may be measured by monetary value, such as a cost of power required to synchronize data stored in the buffer system with data stored in the source system. In one or more embodiments, the cost of executing the data replication operation module 120 may be measured by an amount of resources required to execute the data replication operation module 120, such as an amount of traffic across the network 102 or a load on the CPU 116.

Those of ordinary skill in the art will appreciate that the hardware components and basic configuration depicted in FIG. 1 may vary. The illustrative components within DPS 100 are not intended to be exhaustive, but rather are representative to highlight essential components that are utilized to implement the present invention. For example, other devices/components may be used in addition to or in place of the hardware depicted. The depicted example is not meant to imply architectural or other limitations with respect to the presently described embodiments and/or the general invention. The data processing system depicted in FIG. 1 may be, for example, an IBM eServer pSeries system, a product of International Business Machines Corporation in Armonk, N.Y., running the Advanced Interactive Executive (AIX) operating system or LINUX operating system.

Figure 2:
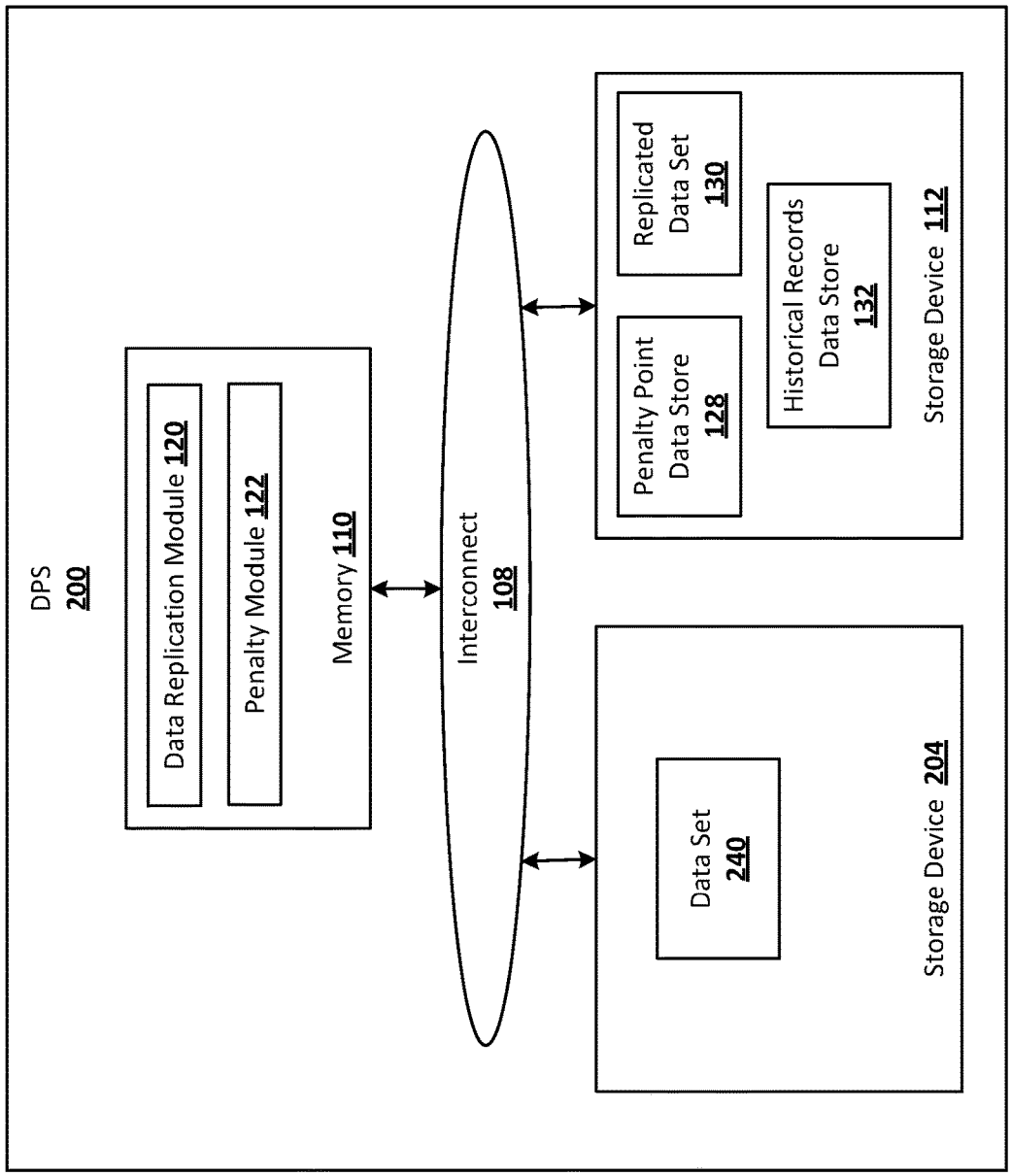
FIG. 2 provides a block diagram representation of an example computing environment with multiple storage devices within which the invention can be practiced, according to one embodiment.

FIG. 2 illustrates a block diagram representation of an alternate example computing environment DPS 200. DPS 200 includes some of the same elements found in DPS 100, including an interconnect 108 that allows communication between memory 110, and a storage device 112. As shown in FIG. 1, memory 110 includes data replication module 120 and penalty module 122. Storage device 112 includes penalty point data store 128, replicated data set 130, and historical records data store 132. As described above, penalty module 122 manages a configurable set of penalties and a predetermined penalty threshold. The configurable set of penalties and the predetermined penalty threshold may be stored, for example, in penalty point data store 128. In addition, penalty module 122 may also dynamically modify the penalty points using, for example, historical records data store 132.

An important distinction between DPS 100 of FIG. 1 and DPS 200 of FIG. 2 is the addition of storage device 204, which includes data set 240. As described above, the buffer system and the source system may reside in two distinct data processing systems. Alternatively, as shown in FIG. 2, source data set 240 may be stored in the same DPS 200 as replicated data set 130. Further, the source data set 240 and the replicated data set 130 may be stored in the same or distinct storage devices.

Figure 3:
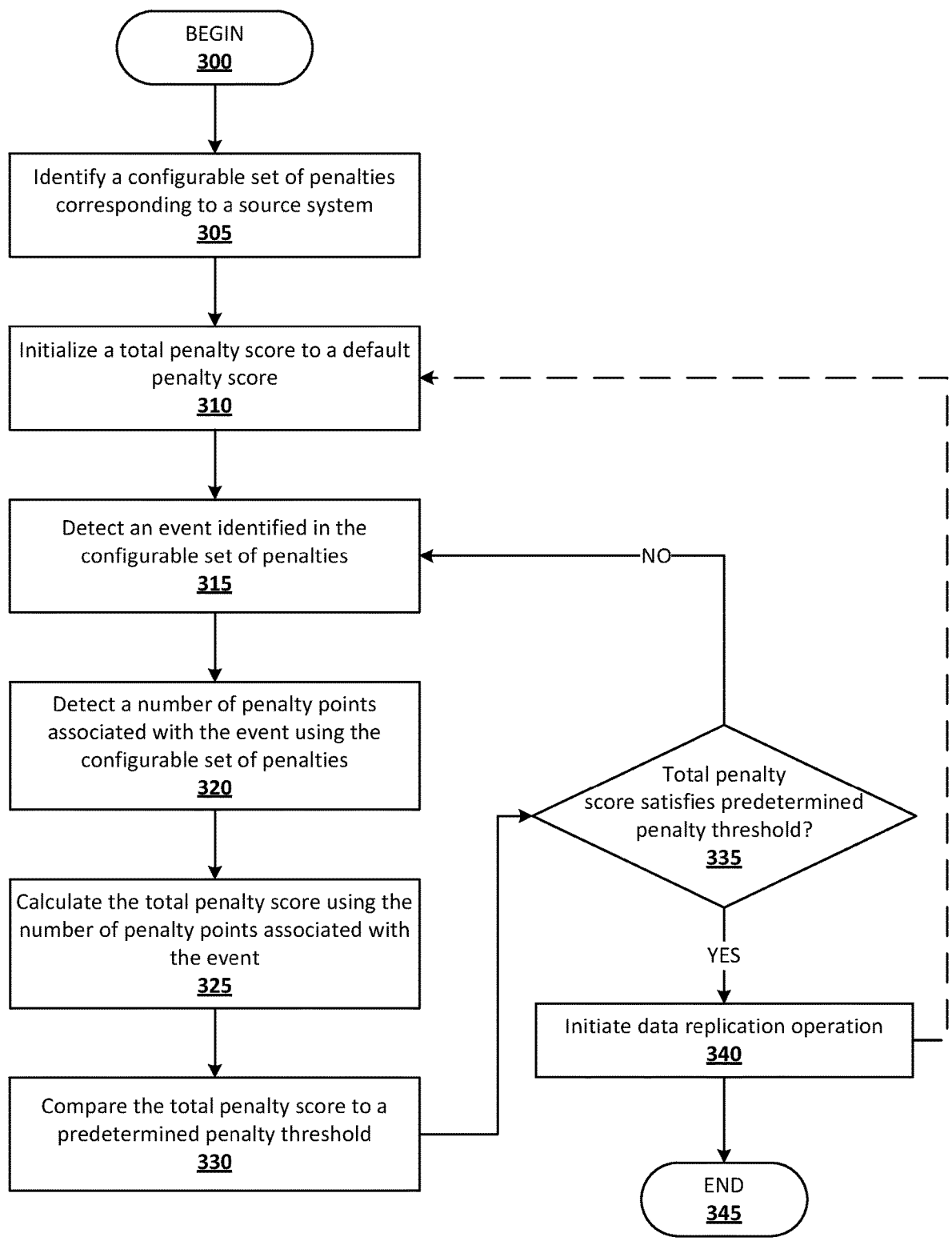
FIG. 3 is a flow chart illustrating the method for initiating a data replication operation using a penalty point system, according to one embodiment.

FIG. 3 is a flow chart illustrating the method for automatically initiating a data replication operation in one embodiment. Specifically, FIG. 3 illustrates a method, implemented by penalty module 122 (which provides executable code executable by a processor), to manage modifiable penalty points, determine when a total number of penalty points satisfies a predetermined penalty point threshold and, in response, initiate the data replication operation.

In the following flowcharts, reference will be made to modules and devices depicted in FIG. 1 for clarity.

The method begins at block 300. At block 305, the penalty module 122 identifies a configurable set of penalties corresponding to a source system. According to one or more embodiments, the penalty module 122 identifies the modifiable penalty points stored in the penalty point data store 128. In one or more embodiments, the penalty module 122 may also identify a predefined penalty threshold, which may be stored within the penalty point data store 128, or any other location across the system. At block 310, the penalty module 122 initializes a total penalty score to a default penalty score. In one or more embodiments, the default penalty score is an initial score, such as "0," although the default score may be any score that differs from the predefined penalty threshold.

At block 315, the penalty module 122 detects an event. The event may be any event or condition that is associated with penalty points in the penalty point data store 128. At block 320, the penalty module detects a number of penalty points associated with the event. The penalty module 122 detects the number of penalty points from the configurable set of penalties that is stored, for example, in the penalty point data store 128. In one or more embodiments, the number of penalty points may be a positive number or a negative number of penalty points depending on the event. For example, an event that contributes to a need to initiate the data replication operation more quickly would be assigned a positive number of penalty points, whereas an event that would contribute to a need to wait to initiate the data replication operation would be assigned a negative number of penalty points.

At block 325, the penalty module 122 calculates the total penalty score using the number of penalty points associated with the event. In one or more embodiments, the total penalty score is calculated by adding the number of penalty points detected at block 320 to either the default penalty score, or a previously calculated total penalty score. At block 330, the penalty module 122 compares the calculated total penalty score to a predetermined penalty threshold. As described above, the predetermined penalty threshold may be stored in the penalty point data store 128, or in some other storage across the system. Further, as described above, the predetermined penalty threshold indicates a total number of penalty points that triggers the data replication operation.

At decision block 335, the penalty module 122 determines whether the calculated total penalty score satisfies the predetermined penalty threshold. In one or more embodiments, the predetermined penalty threshold is satisfied when the total penalty score is either greater than or equal to the predetermined penalty threshold. In another embodiment of the invention, the predetermined penalty threshold may be satisfied when the total penalty score is less than the predetermined penalty threshold.

If, at decision block 335, the total penalty score satisfies the predetermined penalty threshold, the method continues at block 340, and the penalty module automatically initiates the data replication operation. In one or more embodiments, the penalty module 122 initiates the data replication operation by triggering execution of computer code associated with the data replication module 120. After block 340, the method could end at block 345. Alternatively, the method could continue at block 310, and the total penalty score is reinitialized to the default penalty score until an event is detected, and the method continues at block 315.

Returning to block 335, if the penalty module 122 determines that the total penalty score is not satisfied by the predetermined penalty threshold, then the method continues at block 315. At block 315, the penalty module 122 detects another event associated with penalty points in the configurable set of penalties, and the method continues at block 320. Those skilled in the art will appreciate that the method depicted in the flowchart indicates that the penalty module 122 adds penalty points corresponding to each occurring event until the total penalty points satisfies the predetermined penalty threshold and, in response, the data replication operation is initiated.

Figure 4:
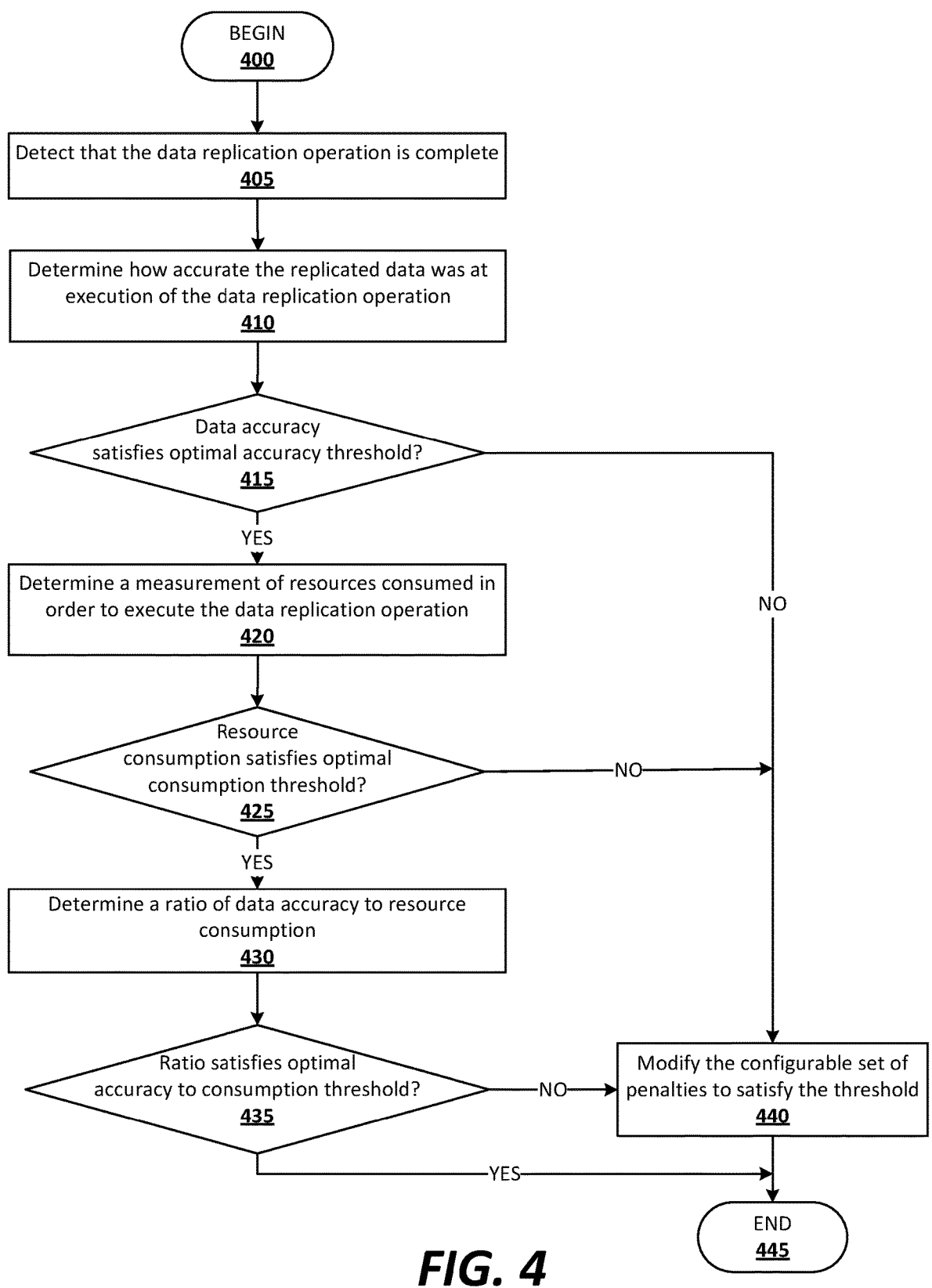
FIG. 4 is a flow chart illustrating the method for dynamically modifying penalty points associated with an event based on user action, according to one embodiment.

FIG. 4 is a flowchart depicting a method of dynamic modification of the configurable set of penalties by analyzing data accuracy and resource consumption after a data replication operation is complete. According to one or more embodiments, analyzing the data accuracy or resource consumption after execution of the data replication operation allows the penalty module 122 to automatically modify the set of penalties (or, in one embodiment, automatically modify the penalty threshold) to reach a balance between data accuracy and consumption of resources.

The method begins at block 400, and at block 405, the penalty module 122 detects that execution of the data replication operation is complete. According to one or more embodiments, execution of the data replication operation is complete when the replicated data set 130 has been synchronized with the data set 140.

The method continues at block 410, where the penalty module 122 determines how accurate the replicated data set 130 was at the time the data replication operation was executed. In one or more embodiments, the accuracy of the replicated data set 130 may be determined based on a ratio of accurate data to inaccurate data, by a total measurement of inaccurate or accurate data, or any other measurement that identifies an amount of data in the replicated data set 130 that did not match the data in the data set 140 at the time the data replication operation was executed.

At block 415 the penalty point module determines whether the data accuracy satisfies an optimal accuracy threshold. In one or more embodiments, the optimal accuracy threshold may be a value stored in the penalty point data store 128, and may identify any value that represents an amount of inaccurate data that should be allowed in the replicated data set 130. If the optimal accuracy threshold is not satisfied (i.e., if the penalty module 122 determines that too much of the data stored in the replicated data set 130 was inaccurate), then the method continues at block 440, and the penalty module 122 modifies the configurable set of penalties in order to satisfy the optimal accuracy threshold. For example, in one or more embodiments, the penalty module 122 may increase the number of penalty points associated with the specific event(s) that contributed to the total number of penalty points that triggered execution of the data replication operation. Alternatively, a number of penalty points associated with an elapsed time may be increased such that the penalty module 122 will trigger execution of the data replication operation more quickly. Further, in one or more embodiments, the penalty module 122 may alternatively, or additionally, decrease the penalty threshold.

Returning to block 415, if the data accuracy does satisfy an optimal accuracy threshold (i.e., the data stored in the replicated data set 130 was not overly inaccurate), then the method continues at block 420. At block 420, the penalty module 122 determines a measurement of resources consumed as a result of execution of the data replication operation. Said another way, the penalty module 122 determines a cost of synchronizing the data in the replicated data set 130 with the data in the data set 240. In one or more embodiments, the measurement of resources consumed may be measured by a weighted value based on the amount of resources used, or any other measurement used to indicate the consumption of resources during execution of the data replication operation. Further, in one or more embodiments, the amount of resource consumption may be identified based on a monetary value associated with the resources consumed during execution of the data replication operation.

At block 425, the penalty point module determines whether the measurement of resource consumption satisfies an optimal consumption threshold. In one or more embodiments, the optimal consumption threshold may be a value stored in the penalty point data store 128, and may identify any value that represents an allowed measurement of resources consumed during execution of the data replication operation. If the optimal resource threshold is not satisfies (i.e., if the penalty module 122 determines that during execution of the data replication operation, the consumption of resources is too great), then the method continues at block 440, and the penalty module 122 modifies the configurable set of penalties in order to satisfy the optimal consumption threshold. For example, in one or more embodiments, the penalty module 122 may increase the number of penalty points associated with events that contributed to the total number of penalty points that triggered execution of the data replication operation. Alternatively, the penalty module 122 may increase a number of penalty points associated with specific resources in order to trigger execution of the data replication module 120 more quickly, or at a time that will require consumption of fewer resources (i.e., at night, over the weekend, or at a time when system resources are typically not in high demand). Further, in one or more embodiments, the penalty module 122 may alternatively, or additionally, decrease the penalty threshold.

Returning to block 425, if the measurement of resource consumption does satisfy an optimal consumption threshold (i.e., if the penalty module 122 determines that during execution of the data replication operation, the consumption of resources sufficiently low), then the method continues at block 430. At block 430, the penalty module 122 determines a ratio of data accuracy to resource consumption. In one or more embodiments, the system may provide an optimal balance between data accuracy and consumption of resources. At decision block 435, the penalty module 122 determines whether the ratio satisfies an optimal accuracy to consumption threshold. If the optimal accuracy to consumption threshold is not satisfies (i.e., if the penalty module 122 determines that the amount of inaccurate data was too small to justify the amount of resources consumed), then the method continues at block 440, and the penalty module 122 modifies the configurable set of penalties in order to satisfy the optimal accuracy to consumption threshold. For example, in one or more embodiments, the penalty module 122 may increase the number of penalty points associated with events that contributed to the total number of penalty points that triggered execution of the data replication operation. Alternatively, the penalty module 122 may increase a number of penalty points associated with specific resources in order to trigger execution of the data replication module 120 more quickly, or increase a number of penalty points associated with specific resources in order to trigger execution of the data replication module 120 more quickly, or at a time that will require consumption of fewer resources. The method ends at block 445.

Figure 5:
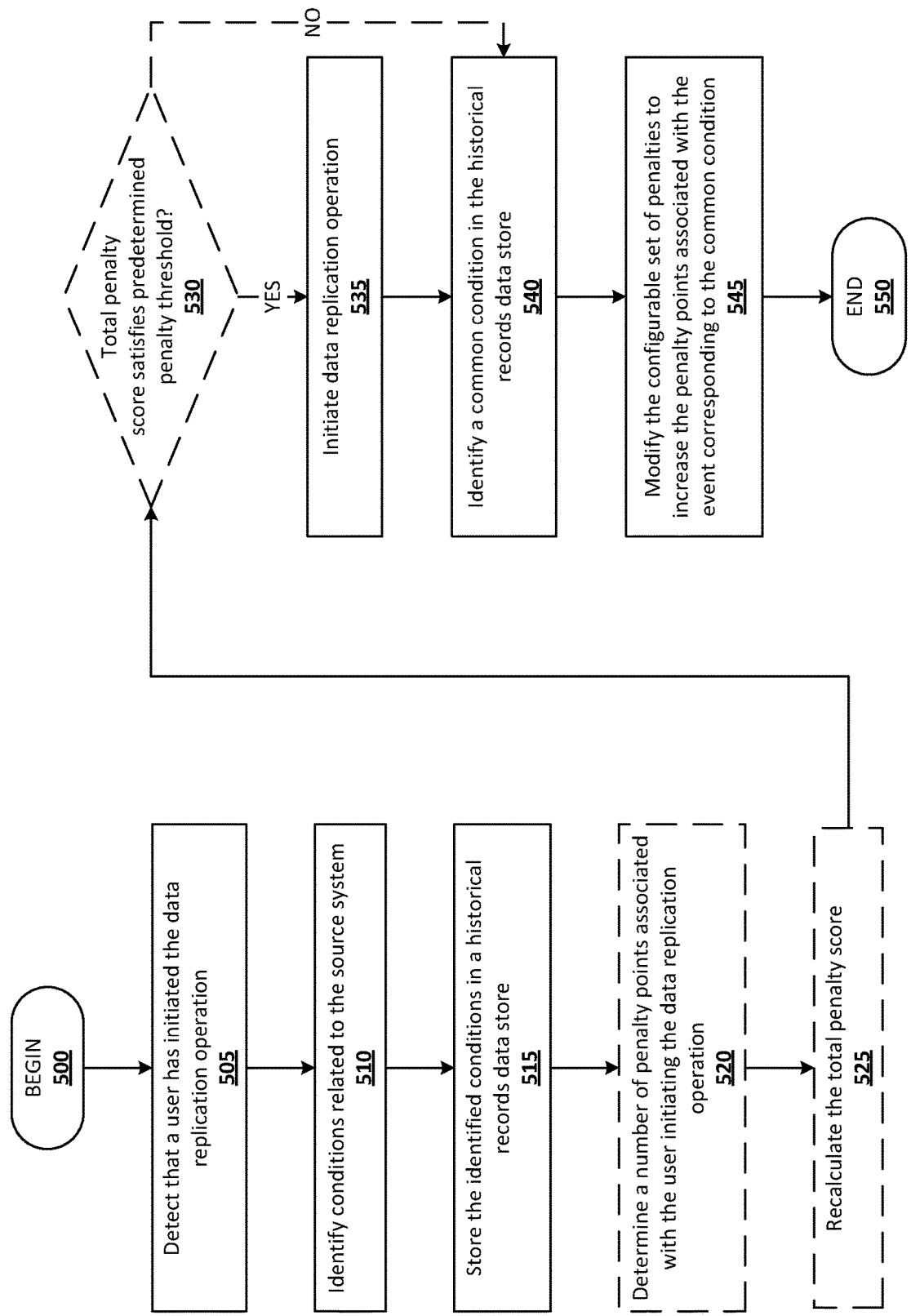
FIG. 5 is a flow chart illustrating the method for dynamically modifying penalty points associated with an event based on a determination of data accuracy and resource consumption, according to one embodiment.

FIG. 5 is a flowchart depicting a method of dynamic modification of the configurable set of penalties by analyzing historic data compiled each time a user triggers execution of the data replication operation. According to one or more embodiments, analyzing the historic data, and modifying the configurable set of penalties accordingly, allows the penalty module 122 to infer human knowledge and automatically improve the configurable set of penalties to obtain an optimal balance between data accuracy and consumption of resources.

The method begins at block 500. At block 505, the penalty module 122 detects that a user has initiated the data replication operation. In one or more embodiments, the penalty module 122 or the data replication module 120 may include a user interface that allows a user to trigger the data replication operation at a time the user believes is optimal or desirable. In one or more embodiments, the user using an interface to trigger execution of the data replication operation may merely be an event associated with a number of penalty points, and is not sufficient, by itself, to execute the data replication operation. In one or more embodiments, a user attempting to trigger execution of the data replication operation is sufficient in block 505 regardless of a total number of penalty points associated with that event.

The method continues at block 510, and the penalty module 122 identifies conditions related to the source system at the time the user initiates the data replication operation. For example, the conditions may include a time of day, a day of the week, or an amount of time since the last synchronization of the data in the replicated data set 130 with data in the data set 140. Further, the conditions may include, for example, events that occurred prior to the user initiating the data replication operation, such as either the source system or buffer system experiencing a network disconnection, an amount of time the source system or buffer system have been offline, or any other event. At block 515, the identified conditions are stored in the historical records data store 132.

Blocks 520-530 include optional features that may or may not be included in one or more embodiments of the method. At block 520 the penalty module 122 determines a number of penalty points associated with the user initiating the data replication operation. As described above, the user initiating the data replication operation may be sufficient to trigger execution of the data replication operation. However, in one or more embodiments, the user initiating the data replication operation may be an event identified in the penalty point data store 128 and may be associated with a number of penalty points. At block 525, the penalty module 122 recalculates the total penalty score using the number of penalty points identified in block 520. At decision block 530, the penalty module 122 determines whether the recalculated total penalty score satisfies the predetermined penalty threshold.

If, at decision block 530, the recalculated total penalty score satisfies the predetermined penalty threshold, or if the user initiating the data replication operation is sufficient to trigger execution of the data replication operation, then the method continues at block 535, and the data replication module 120 executes the data replication operation. If, at block 530, the recalculated total penalty score does not satisfy the predetermined penalty threshold, then block 535 is skipped, and the method continues at block 540.

At block 540, the penalty module 122 analyzes the historical records data store to identify a stored condition that is commonly associated with two or more instances in which a user initiated the data replication operation. At block 545, the penalty module 122 modifies the configurable set of penalties to increase the penalty points associated with the event corresponding to the common condition. The method ends at block 550.

In each of the flow charts above, one or more of the methods may be embodied in a computer readable medium containing computer readable code such that a series of steps are performed when the computer readable code is executed on a computing device. In some implementations, certain steps of the methods are combined, performed simultaneously or in a different order, or perhaps omitted, without deviating from the spirit and scope of the invention. Thus, while the method steps are described and illustrated in a particular sequence, use of a specific sequence of steps is not meant to imply any limitations on the invention. Changes may be made with regards to the sequence of steps without departing from the spirit or scope of the present invention. Use of a particular sequence is therefore, not to be taken in a limiting sense, and the scope of the present invention is defined only by the appended claims.

Figures 6A, 6B:
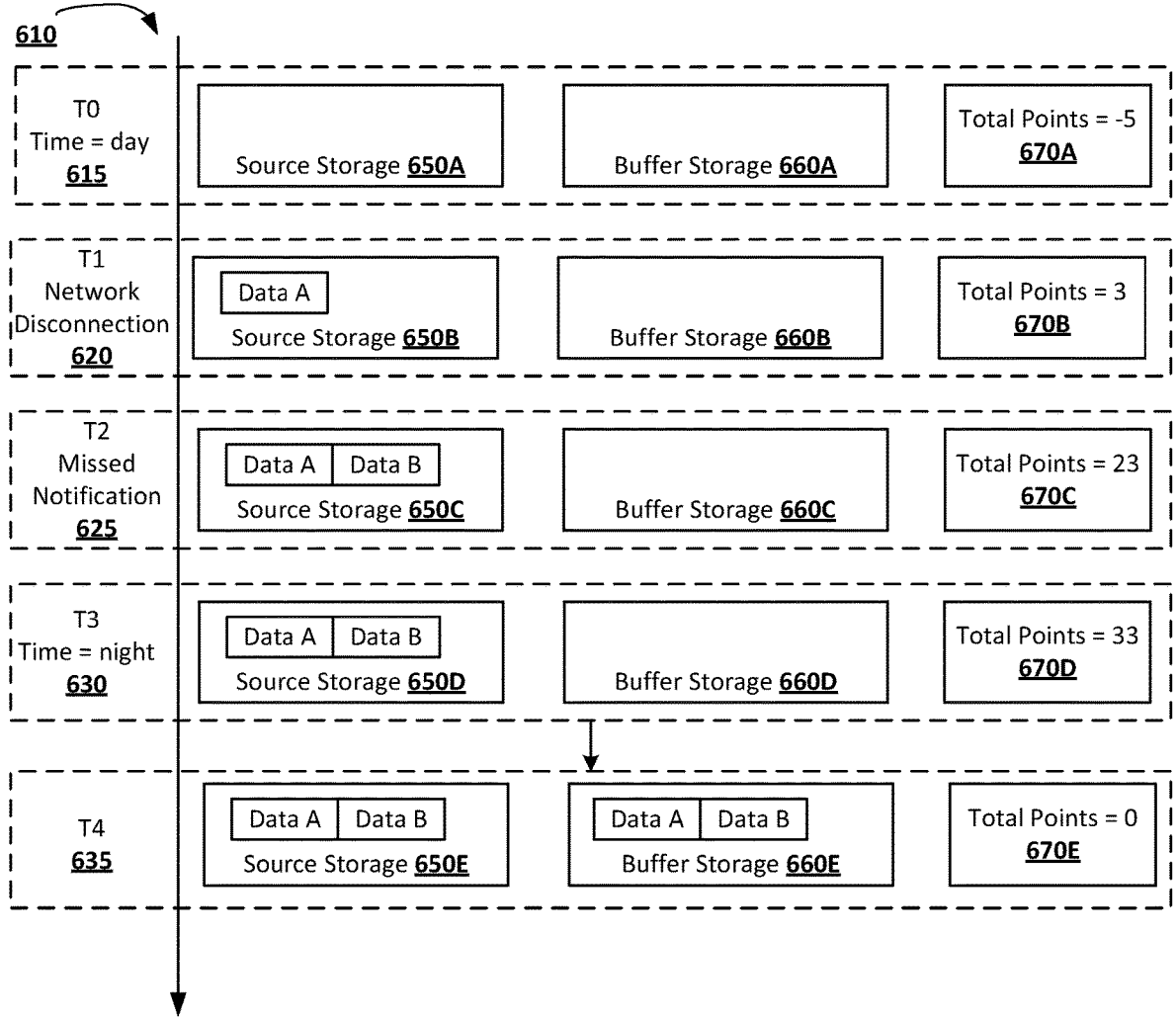
FIG. 6A depicts exemplary data found within the penalty point data store, according to one embodiment.
FIG. 6B depicts an example timeline of initiating a data replication operation using a penalty point system, according to one embodiment.

FIG. 6A depicts an example penalty point data store 600. Those skilled in the art will appreciate that the illustration depicted in FIG. 6A is intended only to provide an example embodiment of the disclosure, and is not intended to limit the disclosure in any way. As depicted, the example penalty point data store 600 includes a value associated with a penalty threshold (i.e., "Threshold=25"), as well as various events and a number of penalty points associated with each event. The events and associated number of penalty points represent the configurable set of penalties. As depicted, a network disconnection is assigned 8 penalty points, detecting that it is daytime (e.g., at a geographic location of a majority of users of DPS 100) is assigned −5 points, detecting that it is night time is assigned 10 points, detecting a missed notification in the source or buffer system is assigned 20 points, and detecting that a user has initiated the data replication operation is worth 25 points. In one embodiment, detecting that it is daytime may be relevant, for example, because it includes regular business hours, whereas night time might include hours during which employees are typically not using the system. It might be preferable to a user to synch data during business hours or, alternatively, outside of business hours. Further in one embodiment, a missed notification may indicate that the buffer system has failed to receive a notification from the source system that data stored within the source system has changed. For example, each notification may be associated with an incrementing identification number. If the buffer system determines that one of the notifications failed, penalty points are assigned.

Those skilled in the art will appreciate, for example, that a missed notification alone is not sufficient to trigger execution of the data replication operation, because the total penalty score would be 20, and would not satisfy the threshold of 25 total penalty points. However, a missed notification and an indication that it is night time is sufficient to trigger the data replication operation because the total penalty points would be 30, and would satisfy the threshold of 25 penalty points.

FIG. 6B depicts an example timeline 610 of employing the penalty module 122 to automatically trigger the data replication operation using the configurable set of penalties and the threshold depicted in FIG. 6A. Time T0 615 through time T4 635 depict snapshots of source storage 650 (i.e., storage including the data set 140), buffer storage 660 (i.e., storage including the replicated data set 130), and a total number of penalty points 670. Those skilled in the art will appreciate that the illustration depicted in FIG. 6B is intended only to provide an example embodiment of the disclosure, and is not intended to limit the disclosure in any way.

The first snapshot depicted on the timeline 610 occurs at T0 615. As depicted in the example, it is day time at T0 615. Accordingly, the threshold may be initialized to a default penalty score of 0, and is recalculated to −5 because the event of detecting that it is day time is assigned −5 points. As depicted, the source storage 650A and buffer storage 660A are empty.

The second snapshot depicted on the timeline 610 occurs at T1 620. As depicted in the example, a network disconnection occurs at T1 620. As shown in FIG. 5A, a network disconnection is assigned 8 points. Accordingly, the total penalty points is recalculated to be 3. At T1 620, the source storage 650B now includes Data A, but the buffer storage 660B has not yet been synchronized because the total penalty points does not satisfy the penalty threshold of 25 points.

The third snapshot depicted on the timeline 610 occurs at T2 625. As depicted in the example, a missed notification occurs at T2 625. As shown in FIG. 5A, a missed notification is assigned 20 points. Accordingly, the total penalty points is recalculated to be 23. At T2 625, the source storage 650C now includes Data A and Data B, but the buffer storage 660B has not yet been synchronized because the total penalty points does not satisfy the penalty threshold of 25 points.

The fourth snapshot depicted on the timeline 610 occurs at T3 630. As depicted in the example, the penalty module detects that it is nighttime at T3 630. As shown in FIG. 5A, detecting that it is night time is assigned 10 points. Accordingly, the total penalty points is recalculated to be 33, which is sufficient to trigger execution of the data replication operation. At T2 625, the source storage 650D now includes Data A and Data B, while buffer storage 660D has not been synchronized prior to execution of the data replication operation.

T4 635 depicts a snapshot that occurs after the data replication operation has executed. As depicted, source storage 650E and buffer storage 660E have been synchronized such that both now include Data A and Data B. Further, the total number of penalty points has been reset to 0 which, for purposes of this example, is the default value for the total penalty points.

Figure 7:
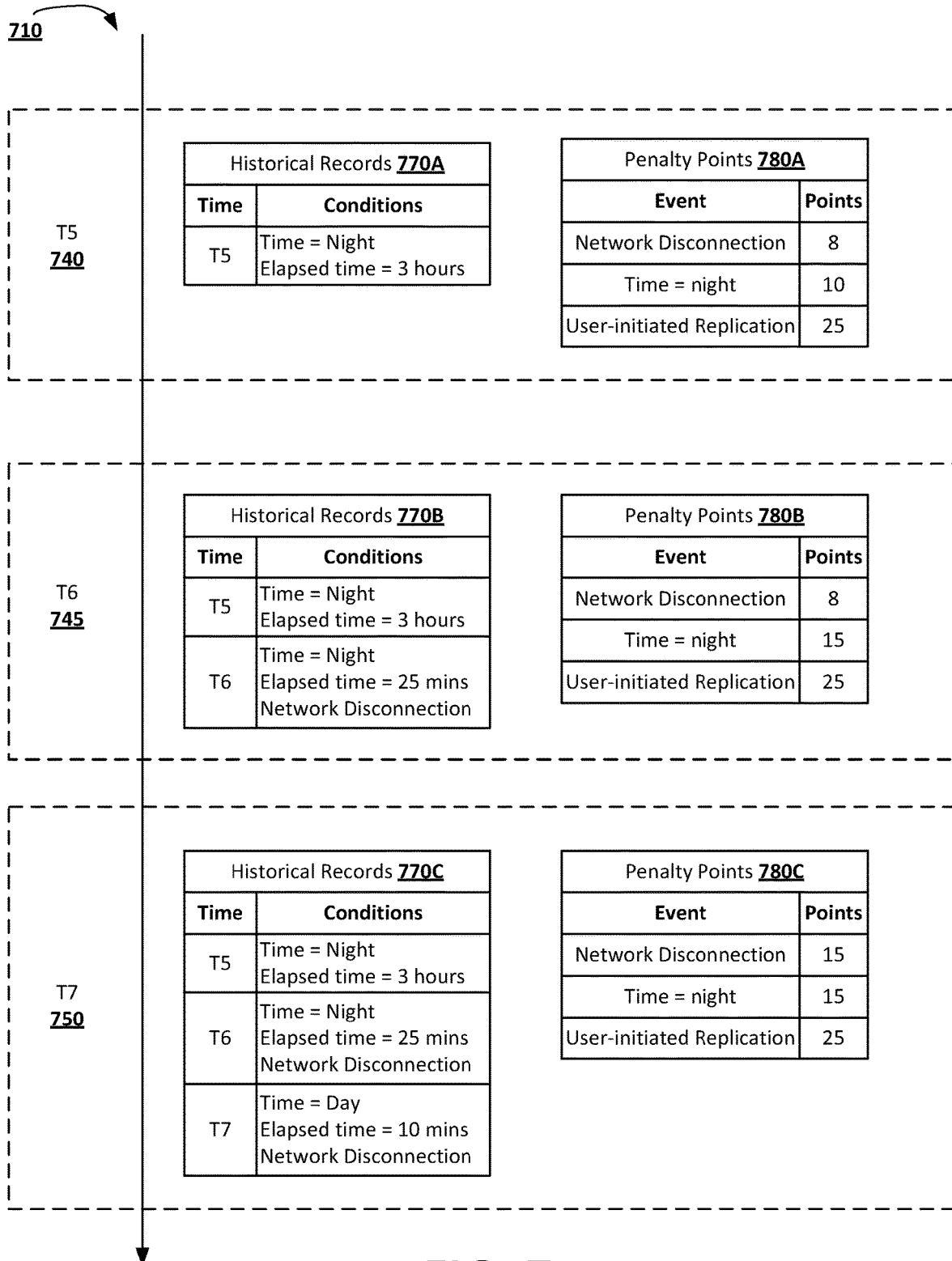
FIG. 7 depicts an example timeline of dynamically modifying penalty points associated with an event, according to one embodiment.

FIG. 7 depicts an example timeline 710 of capturing conditions at each instance a user initiates the data replication operation. Timeline 710 may be an extension of the timeline 610 depicted in FIG. 6B. Time T5 740 through time T7 750 depict snapshots of historical records 770 (i.e., historical records data store 132), and the configurable set of penalties 780 (i.e., the configurable set of penalties within the penalty point data store 128). Those skilled in the art will appreciate that the illustration depicted in FIG. 7 is intended only to provide an example embodiment of the disclosure, and is not intended to limit the disclosure in any way.

The first snapshot depicted on the timeline 710 occurs at T5 740. As depicted in the example, historical records 770A include conditions recorded at time T5 740. Specifically, at T5 740 include an indication that it is night time, and an indication that three hours have elapsed since the data set 140 and the replicated data set 130 were previously synchronized. The configurable set of penalties 780A indicate that a network disconnection is assigned 8 points, detection that it is night time is assigned 10 points, and a user initiating the data replication operation is assigned 25 points.

The second snapshot depicted on the timeline 710 occurs at T6 745. As depicted in the example, historical records 770B now include conditions recorded at time T6 745. Specifically, the conditions at T6 745 include an indication that it is night time, an indication that 25 minutes have elapsed since the data set 140 and the replicated data set 130 were previously synchronized, and an indication that the user initiated the data replication operation following a network disconnection. The penalty module will detect that a common condition at T5 740 and T6 745 is a determination that it is night time. Accordingly, the configurable set of penalties 780B have been modified to increase the number of penalty points associated with night time from 10 to 15 points.

The third snapshot depicted on the timeline 710 occurs at T7 750. As depicted in the example, historical records 770C now include conditions recorded at time T7 750. Specifically, the conditions at T7 750 include an indication that it is day time, an indication that 10 minutes have elapsed since the data set 140 and the replicated data set 130 were previously synchronized, and an indication that the user initiated the data replication operation following a network disconnection. The penalty module will detect that a common condition at T6 745 and T7 750 is a determination that the user initiated the data replication operation following a network disconnection. Accordingly, the configurable set of penalties 780C have been modified to increase the number of penalty points associated with a network disconnection from 8 to 15 points.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code (or instructions) embodied thereon.

Any combination of one or more computer readable medium(s) may be utilized. The computer readable medium may be a computer readable signal medium or, alternatively, a computer readable storage medium. In some embodiments, aspects of the present invention may be embodied within a data replication module (e.g., FPGA or firmware) and implemented in firmware or logic. You can also call these embodiments, a "data replication module" or the like. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible storage device that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, R.F, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Thus, it is important that while an illustrative embodiment of the present invention is described in the context of a fully functional computer (server) system with installed (or executed) software, those skilled in the art will appreciate that the software aspects of an illustrative embodiment of the present invention are capable of being distributed as a computer program product in a variety of forms, and that an illustrative embodiment of the present invention applies equally regardless of the particular type of media used to actually carry out the distribution.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. A method for automatic data synchronization between a source system and a buffer system, the method comprising:
    identifying, at the buffer system, a configurable set of penalties, wherein each penalty in the configurable set of penalties defines a number of penalty points associated with a respective one of a plurality of events related to a data set stored by the source system, wherein the buffer system is configured to store a synchronized copy of the data set, wherein the source system is connected to the buffer system via a network, wherein the number of penalty points associated with each event of the plurality of events is one of a positive number and a negative number, wherein an event that contributes to a need to initiate a data replication operation more quickly is assigned a positive number of penalty points and wherein an event that contributes to a need to wait to initiate the data replication operation is assigned a negative number of penalty points;
    in response to detecting one or more events from among the plurality of events, calculating, at the buffer system, a total penalty score using the penalty points corresponding to each of the one or more events;
    determining, at the buffer system, whether the total penalty score satisfies a predetermined penalty threshold indicating that the synchronized copy is presumed stale;
    in response to determining that the total penalty score satisfies the predetermined penalty threshold, initiating, at the buffer system, a data replication operation that updates the synchronized copy with current data from the data set;
    in response to initiating the data replication operation, determining a cost of completing the data replication operation, wherein the cost is measured by a monetary cost required to complete the data replication operation;
    storing, in a historical records database of the buffer system, records of conditions related to the source system about each time initiation of the data replication operation is requested;
    identifying, from among the stored records, at least one common condition that is associated with each of a plurality of requests to initiate the data replication operation, wherein the at least one common condition is at least one system event within at least one of the buffer system and the source system that has occurred prior to the time of initiation of the data replication operation; and
    modifying the configurable set of penalties to increase the number of penalty points assigned to the at least one system event corresponding to the common condition.

2. The method of claim 1, wherein the one of more events comprises at least a first event and a second event, wherein the first event is associated with a number of penalty points that does not satisfy the predetermined penalty threshold, and wherein the sum of the number of penalty points associated with the first event and a number of penalty points associated with the second event satisfies the predetermined penalty threshold.

3. The method of claim 1, further comprising, in response to initiating the data replication operation:
    determining that the cost of completing the data replication operation satisfies a predetermined cost threshold; and
    in response to determining that the cost of completing the data replication operation satisfies the predetermined cost threshold, modifying the configurable set of penalties to minimize a cost of future data replication operations;
    wherein the cost is measured by at least one of the group including:
    an amount of power used in completing the data replication operation, the amount of time required to complete the data replication operation, and an amount of resources required to complete the data replication operation.

4. The method of claim 1, further comprising, in response to determining that the total penalty score exceeds the predetermined penalty threshold:
    identifying a portion of the data set stored to replicate based on the one or more events, wherein initiating the data replication operation comprises storing the identified portion of the data set on the buffer system.

5. The method of claim 1, further comprising:
displaying historical records indication the one or more events; prompting a user to modify the configurable set of penalties based on the historical records; and
recalculating the total penalty score based on the modified configurable set of penalties based on input from the user.

6. A buffer system for automatic data synchronization, the buffer system comprising:
a processor;
a network interface that couples the buffer system to a source system, the source system having a data set stored therein;
a historical records database; a memory for storing a synchronized copy of a data set stored on the sources system;
data storage coupled to the processor; and
program code stored within the data storage that, when processed by processor, causes the buffer system to:
identify a configurable set of penalties, wherein each penalty in the configurable set of penalties defines a number of penalty points associated with a respective one of a plurality of events related to data set stored by the source system, wherein the number of penalty points associated with each event of the plurality of events is one of a positive number and a negative number, wherein an event that contributes to a need to initiate a data replication operation more quickly is assigned a positive number of penalty points and wherein an event that contributes to a need to wait to initiate the data replication operation is assigned a negative number of penalty points;
in response to detecting one or more events from among the plurality of events, calculate a total penalty score using penalty points corresponding to each of the one or more events;
determine whether the total penalty score satisfies a predetermined penalty threshold indicating that the synchronized is presumed stale;
in response to determining that the total penalty score satisfies the predetermined penalty threshold, initiate a data replication operation that updates the synchronized copy with current data from the data set;
store, in the historical records database, records of conditions related to the source system about each time initiation of the data replication operation is requested;
identify, from among the stored records, at least one common condition that is associated with each of a plurality of requests to initiate the data replication operation, wherein the at least one common condition is at least one system event within at least one of the buffer system and the source system that has occurred prior to the time of initiation of the data replication operation; and
modify the configurable set of penalties to increase the number of penalty points assigned to the at least one system event corresponding to the common condition;
wherein the one of more events comprises at least a first event and a second event, wherein the first event is associated with a number of penalty points that does not satisfy the predetermined penalty threshold, and wherein the sum of the number of penalty points associated with the first event and a number of penalty points associated with the second event satisfies the predetermined penalty threshold.

7. The system of claim 6, wherein the program code further causes the buffer system to:
determine that the cost of completing the data replication operation satisfies a predetermined cost threshold; and
in response to determining that the cost of completing the data replication operation satisfies the predetermined cost threshold, modify the configurable set of penalties to minimize a cost of future data replication operations;
wherein the cost is measured by at least one of the group consisting of: an amount of power used in completing the data replication operation, the amount of time required to complete the data replication operation, and an amount of resources required to complete the data replication operation.

8. The system of claim 6, wherein the program code further causes the buffer system, in response to determining that the total penalty score exceeds the predetermined penalty threshold, to:
identify a portion of the data set to replicate based on the one or more events, wherein initiating the data replication operation comprises storing the identified portion of the data set on the buffer system.

9. The system of claim 6, wherein the program code further causes the buffer system to:
display historical records indication the one or more events;
prompt a user to modify the configurable set of penalties based on historical records; and
recalculate the total penalty score based on the modified configurable set of penalties based on input from the user.

10. A computer program product for automatic data synchronization, the computer program product comprising:
a non-transitory computer readable storage device; and
program code stored within the non-transitory computer readable storage device that, when processed by a processor of a buffer system, causes the buffer system to:
identify a configurable set of penalties, wherein each penalty in the configurable set of penalties defines a number of penalty points associated with a respective one of a plurality of events related to data set stored by a source system, wherein the buffer system is configured to store a synchronized copy of the data set, wherein the source system is connected to the buffer system via a network, wherein the number of penalty points associated with each event of the plurality of events is one of a positive number and a negative number, wherein an event that contributes to a need to initiate a data replication operation more quickly is assigned a positive number of penalty points and wherein an event that contributes to a need to wait to initiate the data replication operation is assigned a negative number of penalty points;
in response to detecting one or more events from among the plurality of events, calculate a total penalty score using the penalty points corresponding to each of the one or more events;
determine whether the total penalty score satisfies a predetermined penalty threshold indicating that the synchronized copy is presumed stale;
in response to determining that the total penalty score satisfies the predetermined penalty threshold, initiate a data replication operation that updates the synchronized copy with current data from the data set;
in response to initiating the data replication operation, determine a cost of completing the data replication operation, wherein the cost is measured by a monetary cost required to complete the data replication operation;

store, in a historical records database, records of conditions related to the source system about each time initiation of the data replication operation is requested;

identify, from among the stored records, at least one common condition that is associated with each of a plurality of requests to initiate the data replication operation, wherein the at least one common condition is at least one system event within at least one of the buffer system and the source system that has occurred prior to the time of initiation of the data replication operation; and modify the configurable set of penalties to increase the number of penalty points assigned to the least one system event corresponding to the common condition;

wherein the one of more events comprises at least a first event and a second event, wherein the first event is associated with a number of penalty points that does not satisfy the predetermined penalty threshold, and wherein the sum of the number of penalty points associated with the first event and a number of penalty points associated with the second event satisfies the predetermined penalty threshold.

11. The computer program product of claim 10, wherein the program code further causes the buffer system to:

determine that the cost of completing the data replication operation satisfies a predetermined cost threshold; and in response to determining that the cost of completing the data replication operation satisfies the predetermined cost threshold, modify the configurable set of penalties to minimize a cost of future data replication operation;

wherein the cost is measured by at least one of the group consisting of: an amount of power used in completing the data replication operation, the amount of time required to complete the data replication operation, and an amount of resources required to complete the data replication operation.

12. The computer program product of claim 10, wherein the program code further causes the buffer system to:

in response to determining that the total penalty score exceeds the predetermined penalty threshold, identify a portion of the data set stored to replicate based on the one or more events, wherein initiating the data replication operation comprises storing the identified portion of the data set on the buffer system;

display historical records indicating the one or more events;

prompt a user to modify the configurable set of penalties based on the historical records; and recalculate the total penalty score based on the modified configurable set of penalties based on input from the user.

13. The method of claim 1, further comprising:

detecting that a user has requested to initiate the data replication operation; and in response to detecting that the user has requested to initiate the data replication operation:

determining a number of penalty points associated with the user requesting to initiate the data replication operation;

recalculating the total penalty score by adding the determined number of penalty points to the previously calculated total penalty score;

determining that the total penalty score satisfies the predetermined penalty threshold; and in response to determining that the total penalty score satisfies the predetermined penalty threshold, initiating the data replication operation.

14. The system of claim 6, wherein the program code further causes the buffer system to:

detect that a user has requested to initiate the data replication operation; and in response to detecting that the user has requested to initiate the data replication operation:

determine a number of penalty points associated with the user requesting to initiate the data replication operation;

recalculate the total penalty score by adding the determined number of penalty points to the previously calculated total penalty score;

determine that the total penalty score satisfies the predetermined penalty threshold; and in response to determining the total penalty score satisfies the predetermined penalty threshold, initiate the data replication operation.

15. The computer program product of claim 10, wherein the program code further causes the buffer system to:

detect that a user has requested to initiate the data replication operation; and in response to detecting that the user has requested to initiate the data replication operation:

determine a number of penalty points associated with the user requesting to initiate the data replication operation;

recalculate the total penalty score by adding the determined number of penalty points to the previously calculated total penalty score;

determine that the total penalty score satisfies the predetermined penalty threshold; and in response to determining that the total penalty score satisfies the predetermined penalty threshold, initiated the data replication operation.

16. The method of claim 1, further comprising:

initializing the total penalty score to a default penalty score, wherein the default penalty score is an integer that differs from the predetermined penalty threshold; and increasing the number of penalty points associated with an elapsed time such that execution of the data replication operation is triggered more quickly.

17. The method of claim 1, further comprising:

increasing the number of penalty points associated with an elapsed time such that execution of the data replication operation is triggered at a time where the data replication operation requires consumption of fewer resources.

18. The method of claim 1, wherein modifying the configurable set of penalties to increase the number of penalty points assigned to an event corresponding to the at least one common condition further comprises decreasing a number of points associated with the predetermined penalty threshold.

19. The method of claim 1, wherein the at least on system event comprises at least one network disconnection.

20. The method of claim 1, wherein the at least one system event is associated with at least one of:

a time since a last updating of the synchronized copy, an amount of time that at least one of the source system and buffer system has been offline, a time of day, and a day of the week.

* * * * *